United States Patent

Reisch et al.

(10) Patent No.: US 7,951,043 B2
(45) Date of Patent: May 31, 2011

(54) METHOD AND DEVICE FOR CONTROLLING THE OIL SUPPLY OF AN AUTOMATIC GEARBOX AND A STARTING ELEMENT

(75) Inventors: Matthias Reisch, Ravensburg (DE); Ralf Dreibholz, Meckenbeuren (DE); Gerhard Gumpoltsberger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 854 days.

(21) Appl. No.: 11/908,658

(22) PCT Filed: Mar. 8, 2006

(86) PCT No.: PCT/EP2006/002106
§ 371 (c)(1),
(2), (4) Date: Sep. 14, 2007

(87) PCT Pub. No.: WO2006/099947
PCT Pub. Date: Sep. 28, 2006

(65) Prior Publication Data
US 2009/0232673 A1  Sep. 17, 2009

(30) Foreign Application Priority Data
Mar. 22, 2005  (DE) .................. 10 2005 013 137

(51) Int. Cl.
*F16H 61/26* (2006.01)
(52) U.S. Cl. .................. 477/156; 192/133.3
(58) Field of Classification Search .................. 180/65.7; 192/113.3–113.36, 70; 477/3, 5, 156
See application file for complete search history.

(56) References Cited

U.S. PATENT DOCUMENTS

| | | | |
|---|---|---|---|
| 3,960,249 A * | 6/1976 | Stirling | 188/264 F |
| 5,474,428 A | 12/1995 | Kimura et al. | |
| 5,845,756 A * | 12/1998 | Dairokuno et al. | 192/85.61 |
| 6,135,919 A | 10/2000 | Shimakura | |
| 6,350,108 B1 | 2/2002 | Haupt | |
| 6,390,947 B1 | 5/2002 | Aoki et al. | |
| 6,692,402 B2 * | 2/2004 | Nakamori et al. | 477/3 |
| 7,163,481 B2 | 1/2007 | Takagi et al. | |
| 2005/0064975 A1 | 3/2005 | Takagi et al. | |

FOREIGN PATENT DOCUMENTS

| | | |
|---|---|---|
| DE | 25 57 586 | 6/1977 |
| DE | 101 62 973 A1 | 8/2002 |
| DE | 101 60 884 A1 | 6/2003 |
| DE | 103 27 406 A1 | 2/2005 |

(Continued)

*Primary Examiner* — David D Le
*Assistant Examiner* — Derek D Knight
(74) *Attorney, Agent, or Firm* — Davis & Bujold, P.L.L.C.

(57) ABSTRACT

A method and a device for controlling the oil supply of an automatic transmission (gearbox) and to a starting element. The method can guarantee a sufficient supply of oil to a hydraulic control unit of the automatic transmission and/or the starting element, in particular an oil-cooled friction clutch, both during the operation of the internal combustion engine (4) and when the latter is at a standstill with the aid of an oil pump (2) that can be mechanically driven by the internal combustion engine (4) and a second oil pump (3) that can be electrically driven. In addition, the cooling oil supply of the starting element is guaranteed by the provision of a low-pressure oil by way of the electrically driven oil pump (3), at least during the starting operation, the stream cooling the starting element (11).

12 Claims, 1 Drawing Sheet

FOREIGN PATENT DOCUMENTS

| | | |
|---|---|---|
| EP | 1 223 365 A2 | 7/2002 |
| EP | 1 260 739 A2 | 11/2002 |
| EP | 1 420 185 A2 | 5/2004 |
| JP | 2000-46166 | 2/2000 |
| JP | 2001-74130 | 3/2001 |
| JP | 2002-195390 | 7/2002 |

* cited by examiner

METHOD AND DEVICE FOR CONTROLLING THE OIL SUPPLY OF AN AUTOMATIC GEARBOX AND A STARTING ELEMENT

This application is a national stage completion of PCT/EP2006/002106 filed Mar. 8, 2006, which claims priority from German Application Serial No. 10 2005 013 137.9 filed Mar. 22, 2005.

FIELD OF THE INVENTION

The invention concerns a method and arrangement for controlling the oil supply of an automatic transmission and a starting element.

BACKGROUND OF THE INVENTION

Automatic transmissions have been in use for some time, in particular in motor vehicles, to convert an input speed supplied by a vehicle's prime mover and/or an internal combustion engine into an output speed used for driving the wheels, where the driver is relieved, at least for the most part, from selecting the appropriate gear ratio.

The gear ratios of these automatic transmissions can be infinitely variable or can have individual transmission ratios with predetermined gear ratios. For the most part, they are shifted by way of hydraulic shifting elements, which require an oil supply that has a sufficient volume and pressure for their operation. An oil pump, which is mechanically driven by the internal combustion engine of the vehicle, is commonly used for this function.

A gear ratio change, which automatically shuts down the vehicles when specific conditions are present, is frequently provided in modern drive concepts in order to minimize the consumption of fuel, as well as the emission of pollutants. This can be the case, for instance, during the "sailing mode", when the vehicle is coasting, as well as during standstill, and is known under the term of a start/stop function. When it is determined that the driver wants to continue driving, or the driver again requests a driving torque from the internal combustion engine by actuating the accelerator pedal, the internal combustion engine is again started without requiring any further operating steps by the driver, a corresponding drive gear ratio is engaged or maintained within the automatic transmission, and the drive clutch is engaged.

Since an oil pump, which is driven by an internal combustion engine, does not generate power when the engine is shut down, it is known to provide an electrically driven auxiliary oil pump, which will either continuously maintain the hydraulic supply or at least provide a sufficient oil flow at the required pressure when necessary during inactivity of the internal combustion engine in order to enable a hydraulic shifting of the automatic transmission and, if necessary, make the supply of additional aggregates or components.

From DE 101 62 973 A1 an arrangement is known for controlling the actuation of an oil supply, which has an electrical oil pump in addition to a mechanical oil pump. Both oil pumps feed a hydraulic control unit for the purpose of driving an automatic transmission and a clutch positioned between the internal combustion engine and the transmission. In order to ensure the availability of a sufficient hydraulic pressure and a respective oil flow volume, which are necessary to shift the automatic transmission and the clutch during shutdown of the internal combustion engine, the electrical oil pump is activated based on predetermined criteria when a speed limit value of the internal combustion engine and/or the hydraulic pressure of the mechanical oil pump related thereto are underexceeded. Once the internal combustion engine is again started and its rotational speed is above a second rotational speed limit, the electrical oil pump is again switched off.

From U.S. Pat. Nos. 5,474,428 A and 6,390,947 B1, as well as EP 1,223,365 A2, similar arrangements are known where an electrical oil pump, in connection with a start/stop function, always ensures that a hydraulic pressure, which is sufficient to shift the transmission, is maintained and/or quickly built up when the internal combustion engine is switched off.

In oil pumps that are mechanically driven by the internal combustion engine, the pump output is at least approximately proportional to its rotational speed, because of the usually rigid coupling to the rotational speed of the internal combustion engine. Instead, the pressure and/or volume flow required for shifting the automatic transmission and a drive clutch is nearly constant and only slightly increases when the transmission receives a normal supply of lubricant by way of the same pump, while the rotational speed or travel speed are increased. Since the mechanically driven oil pump is operated separately for the most part during normal driving operation and an electrical oil pump is activated at best when the rotational speeds of the internal combustion engine are particularly low, the mechanical oil pump must be designed such that it will deliver a sufficient pump output even at low rotational speeds of the internal combustion engine. At high rotational speeds, this would cause an unnecessarily high supply output and would have a corresponding energy loss as a consequence.

The internal combustion engine is generally coupled to an automatic transmission by way of a clutch element that is generally also referred to as a starting element, in particular a friction clutch. So-called wet or oil-cooled starting elements can preferably be used therein. In order to separate the clutches provided in automatic transmissions for the synchronization of transmission components, these starting elements will be referred to as drive clutches. It is unimportant if the drive clutch is structurally separated from the transmission. What is important with regard to its function is that it should transmit the torque of the internal combustion engine to the transmission in a controlled manner, wherein an intermediate position in which the clutch slips is available, in addition to the basic positions of "disengaged" and "fully engaged".

Although relatively moderate loads occur on the drive clutch when shifting the transmission while driving, the clutch regularly works during starting operations at least in automatic transmissions with fixed gear ratios with slippage until the vehicle speed, the selected gear ratio and the rotational speed of the internal combustion engine enable complete engagement of the clutch. This is the reason why the demand for the coolant supplied to the vehicle clutch is particularly high mostly during starting operations.

It is not feasible to increase the rotational speed of the internal combustion engine to increase the pump output of a mechanical oil pump driven by the internal combustion engine, because the power loss of the drive clutch and also the need for cooling oil are increased directly proportional to the rotational speed of the internal combustion engine.

A design of the oil pump that is sufficient for performing the starting operation has as a result high rotational speeds of the internal combustion engine, an unnecessarily high pump output is available and accordingly great energetic losses are produced, which are reflected in increased fuel consumption as well as increased emission values.

However, even though it is basically conceivable to disengage the rotational drive from the internal combustion engine to the mechanically driven oil pump, for example, by way of an adjustable transmission, or to decrease the pump output of the oil pump when required, for example, with pumps having adjustable output volumes, and thus to reduce the energy losses, these solutions are mechanically quite complex and therefore expensive and prone to failure.

JP 2001 074 130 A describes a hydraulically shiftable transmission with an electrically driven oil pump for supplying a hydraulic control unit. A mechanically driven oil pump feeds an oil coolant flow. A bypass line, which is designed to ensure that the hydraulic control unit is supplied by the mechanically driven oil pump in the event of a failure of the electrical oil pump, is installed between each of the two oil cycles, which are both supplied from the same reservoir. A check valve prevents the oil flow of the electrical oil pump from being fed into the oil cycle provided for cooling.

In this technical solution, the mechanical oil pump must also be configured for the maximum pump output, necessary for starting conditions. In addition, the continuous operation of the electrical oil pump for supplying the hydraulic control unit causes substantial energy losses during the conversion of mechanical into electrical energy and back into mechanical energy.

In this context, it is an object of the invention to disclose a method and an arrangement for controlling the oil supply of an automatic transmission and a starting element, which can ensure a sufficient supply of oil to a hydraulic control unit of the automatic transmission and/or the starting element, in particular an oil-cooled friction clutch, both during operation and inoperation of the internal combustion engine, with the aid of an oil pump that can be mechanically driven by the internal combustion engine and a second oil pump that can be electrically driven. In addition, the cooling oil supply of the starting element is guaranteed according to the method by providing a low-pressure oil flow by way of the electrically driven oil pump so that at least an oil flow for cooling the starting element is available during the starting operation.

SUMMARY OF THE INVENTION

The invention is based on the principle that an oil pump that can be mechanically driven by the internal combustion engine by itself is hardly sufficient to supply the increased need for cooling oil during starting operations, because it is not feasible in this case to increase the rotational speed of the internal combustion engine in order to increase the pump output, and because configuring the oil pump to handle this increased cooling requirement during low rotational speeds will lead to a substantial over-sizing of the oil pump for normal driving operations and therefore to substantial energy losses. The invention further presupposes that a need-based addition to the output of the oil pump that can be mechanically driven by the internal combustion engine by an electrically driven oil pump allows a smaller sized mechanically driven oil pump, which allows the realization of cost benefits in the acquisition of the mechanically driven oil pump as well as avoiding substantial energy losses during the driving operation.

The invention is therefore based on a method for controlling the supply of oil to an automatic transmission and a starting element, where at least two oil pumps are available for supplying at least one hydraulic control device of the automatic transmission and/or the starting element in a high-pressure flow and/or in a low-pressure flow, a first of these oil pumps can be mechanically driven by the internal combustion engine and a second oil pump that can be electrically driven to supply, at least during standstill of the internal combustion engine as well as during other operating conditions, an oil pump output to the hydraulic control device and wherein the starting element is fluid-cooled.

As previously mentioned, the fluid-cooled starting element is herein generally an oil-cooled friction clutch, which is positioned between the internal combustion engine and the gearbox depending on the drive, although it can be structurally integrated into the gearbox. In the case of motor vehicles, drive is normally supplied by an internal combustion engine. The drivetrain of a motor vehicle can also be designed as a hybrid drive with an electric motor and an internal combustion engine. The other operating conditions for the operation of electrically driven oil pumps can be comprised of at least the availability of adequate electrical power or can relate to the oil temperature or other parameters.

In order to attain the objective of the invention, it is additionally provided that the electrically driven oil pump supplies an oil flow for cooling of the starting element at least during starting operations.

This surprisingly simple procedure permits in the operating area, a highly increased oil flow, necessary for cooling the starting clutch, which can be mechanically driven by the internal combustion engine such that the pump output that must be generated by the oil pump, is reduced. This makes it possible to substantially reduce the size of the latter oil pump which, in addition to a savings in weight and cost, leads particularly to a substantially lowered loss of performance for this pump at higher rotational speeds of the internal combustion engine. This results in a reduction of fuel consumption as well as pollution emissions of a motor vehicle.

In addition, reducing the performance loss of the mechanically driven pump, which is otherwise predominantly converted into heat, leads to a desired reduction of heat generation in the oil. This leads to additional positive effects, such as the possibility of installing a smaller oil-heat exchanger or even eliminate the latter completely.

In a first development of the method, the oil pump that is mechanically driven by the internal combustion engine supplies during a normal driving condition, in other words, after a completed starting process, at least the main part of the oil flow that is used for the residual heat exchange of the starting element. A normal driving condition is to be understood, in this context, as driving with the internal combustion engine running, the drive clutch engaged, and a gear engaged, at a rotational speed of the internal combustion engine that is noticeably above the idle speed.

This enables the electrically driven oil pump to be operated at reduced output for the majority of the vehicle's operating time and can be preferably completely switched off according to a second development of the method.

The latter does not only permit designing the electrically driven oil pump to have a reduced service life, but has also energetic advantages, since the loss-prone conversion of mechanical energy into electrical energy and back into mechanical energy can be minimized. In addition, the on-board electrical system, and possibly the vehicle battery and/or the generator of the vehicle, are less loaded.

It remains as task for the developer in the concrete application case, to determine a desired optimum between the lowest possible operating portion of the electrically driven oil pump and the lowest possible pump output of the mechanically driven oil pump. It appears to be practical herein, with a given or presumed viscosity and temperature of the oil, to configure the mechanically driven oil pump in such a manner that it can supply the necessary pump output by itself, starting at a predetermined rotational speed limit of the internal combustion engine. A feasible rotational speed limit of the internal combustion engine could be, for instance, between 1200 and 2500 RPM.

It is generally possible for the electrically driven oil pump to provide the pump output in the sense of a backup reserve during a partial or complete failure of the mechanically driven oil pump, and thus improve the reliability of the oil supply through a redundant design. In the event of a failure of the electrically driven oil pump, the mechanically driven oil pump can then supply the required oil flow by itself in all operating conditions.

For vehicles that require a normal reliability of their oil supply, it is however preferred when the oil pump, that can be mechanically driven by the internal combustion engine, is configured in such a manner that it is not capable of supplying by itself the oil flow necessary for the starting operation, which is required to cool the starting element, since the structural size and output loss of this oil pump can be kept to a minimum for normal driving operations.

Since the electrically driven oil pump operates only upon demand and its output can be adjusted by the simplest means, it can be preferably configured in such a manner that it alone can guarantee a sufficient supply of oil to a hydraulic control unit of the automatic transmission and/or the starting element, as well as for cooling the starting element.

A redundant design of the oil supply pumps is thus achieved by incurring only minor additional output losses and component costs. It is certainly possible in the context of the minimization of the component costs and the output losses, to also ignore this redundant design and instead select the output for the electrically driven oil pump in such a way that, at a maximum pump output demand, the mechanically driven and the electrically driven oil pump jointly supply the pump output required to make the respective rotational speed of the internal combustion engine available. In this case, the operational safety can be increased with the further developments of the method, which are described in more detail in the following.

The pump output of an oil pump is known to be comprised of the oil volume supplied per time unit and the pressure of the supplied oil and/or the pressure difference between the intake line and the output line of the pump. Although high oil pressures, but small flow rates, are frequently required to operate the hydraulic control unit for controlling the automatic transmission and/or the drive clutch, the oil flow, used for the cooling of the drive clutch and, for example, also for the oil flow routed through an oil cooler, have a completely opposite behavior.

A lowering of the oil pressure for these purpose, by way of a simple pressure reducer, in this case will lead to extensive energy losses and to undesirable heating of the oil. In addition, in this case the oil pumps must be configured in such a manner that they can supply the entire oil flow needed at the high pressure required for the hydraulic control system.

In a further development of the method, the electrically driven oil pump and/or the mechanically driven oil pump co-act in such a way with a conversion device, that a higher fed oil volume, which is used for cooling the starting element with a reduced feed pressure, is generated from an oil quantity, which is fed by an electrically driven oil pump and/or a mechanically driven oil pump. It is understood when considering the invention that in this case only the pressure of that partial oil flow is reduced, which requires a reduced oil pressure. This can be achieved in a particularly easy and cost effective manner and with low maintenance requirements when a Venturi nozzle is used as a conversion device.

Since the electrically driven oil pump must ensure a sufficient oil supply, particularly when the internal combustion engine is turned off and the generator is thus at standstill, the demands placed on the onboard electric system as well as on a battery installed in the vehicle, are however particularly high, according to a further embodiment of the invention, it is planned that, for the supply of the electrically driven oil pump in addition to the electrical onboard electric system and/or a battery, a capacitor is also installed. In this manner, at least part of the energy that is necessary for the operation of the oil pump can be stored in the event of an old battery with reduced output, in the capacitor for a comparably long period, and will thus be available for the short-term demand of the oil pump motor.

Even for a new battery, it is thus possible to reduce the discharge currents of the battery directly prior to the start of the internal combustion engine and thus minimize voltage drops of the onboard electric system for each operational phase of the electrically driven oil pump. Suitable capacitors are known, for example, under the name "Ultracap".

It is additionally preferred when a device is provided for evaluating the operation of the electrically driven oil pump to determine the available electrical energy such that when the available electrical energy drops below a first threshold value, a first shortage signal is transmitted. The available energy volume is thereby preferred to be an energy volume that is available for a short period which, when drawn from the onboard electric system, does not cause undesirable effects, such as unacceptable voltage drops or undesirably high currents within one part of the onboard electric system or the vehicle battery.

This device can comprise, for example, a so-called SOC-monitor or SOH-monitor, which is already known, wherein SOC stands for "State Of Charge" or the charge state, and SOH stands for "State Of Health" or the health condition and/or the age or deterioration of the battery.

The starting operation, which is the allocation of a sufficient oil pressure that precedes the actual starting of the internal combustion engine, and the actual starting procedure of the internal combustion engine, can be suppressed when the first shortage signal is received, until the capacitor is at least predominantly fully charged, which aids in drastically reducing the demand on the battery immediately prior to the starting of the internal combustion engine. The term "predominantly fully charged" refers in this case to the electrical charge, which is stored under the current conditions in the capacitor, and does not refer to the physically possible or maximum charge of the capacitor.

It is further provided that a specific time period must elapse following the predominantly full charge of the capacitor before the operation of the electrically driven oil pump is released in order to allow the battery to recover, for the most part, from the preceding current draw. This waiting period can also be logically coupled to the activation of a second shortage signal, which is described in detail in the following.

When the arrangement for evaluating if the electrical energy, available for the operation of the electrically driven oil pump, drops below a second threshold value of the available electrical energy, which is less than the first threshold value, transmits a second shortage signal, it is possible to effectively determine the difference, between a minor and/or short-term supply shortage and a severe disruption of the power supply. While the former can be easily countered with the above-described methods, the activation of the second shortage signal indicates a severe and/or long-term problem with the electrical supply of the electrically driven oil pump and thus permits the selection of special operating strategies.

In this way, it is possible according to an embodiment of the invention to refrain from operating the electrically driven oil pump in the event of a second shortage signal, but to instead supply the oil flow, for necessary cooling the starting element, for the starting operation only by way of the oil pump that can be mechanically driven by the internal combustion engine.

In this, the hydraulic control device of the automatic transmission and/or the starting element allows a configuration of the starting procedure, which is such that the least possible heat is generated in the starting element. An emergency operation in the event of a severely discharged battery is thus possible, which is noticed only by the driver due to a moderately deteriorated starting behavior of the vehicle. This strategy can, of course, even be applied when the electrically driven oil pump cannot be operated due to other circumstances.

In order to control the electrically driven oil pump as effectively as possible, it is finally useful to provide an oil volume demand sensor, which detects the current and/or directly upcoming oil volume demand of the hydraulic control device of the automatic transmission and/or the starting element and also calculates the current and/or directly upcoming oil pump output by way of the oil pump that can be mechanically driven by the internal combustion engine, and then determines an oil volume demand, based on this oil volume demand and the oil pump output of the oil pump, which is mechanically driven by the internal combustion engine.

The pump output of the electrically driven oil pump can be very precisely controlled in this way and its energy demand can thus be minimized. An estimate of the directly upcoming values permits, on the contrary, adjustment of the pump output of the electrically driven oil pump so early that a sufficient total pump output is always available during an increase of the rotational speed, even when considering a time delay during the control of the pump, for instance due to necessary acceleration of inert masses.

The input values of the oil volume demand sensor can thus be preferably based on sensor values, but can also be determined, for instance, by way of mathematical models and self-learning methods or other evaluation methods.

Since the viscosity of the oil and its ability to cool the starting element significantly depends on the oil temperature, another improvement of how to determine the oil volume demand can be achieved by taking into account the oil temperature when determining the oil volume demand and/or the oil pump output and/or the added oil volume demand.

An energy-optimized development of the method is achieved when the electrically driven oil pump is controlled in such a manner that its output is at least equal to the additional oil volume demand, wherein the term "equal to" can by all means include the availability of a pump output reserve.

As previously briefly mentioned in the description of the invention, the invention also concerns a method for controlling the various operating modes of the oil supply system. In a first operating mode, when the internal combustion engine is switched off, it can be provided that the mechanically driven oil pump is inactive and the electrically driven oil pump is being driven;
a switching valve is actuated in such a manner that the lubricating oil supply for the transmission and the cooling oil supply for the starting element by means of the electrically driven oil pump is at least for the most part interrupted;
no oil flows into the common oil reservoir through the mechanically driven oil pump, and
the electrically driven oil pump generates an oil pressure such as this, and the latter is guided to a pressure regulator for the shifting elements of the automatic transmission so that these shifting elements are kept in a prefilled condition or in a condition to be prefilled.

This operating mode guarantees that even when an internal combustion engine is shut down, a sufficient oil pressure supply is ensured for prefilling of the transmission shifting elements so that a start can be quickly accomplished after the internal combustion engine is started.

A backflow through the main pressure valve into the common oil reservoir is prevented by closing the main pressure valve or locking a check valve between the mechanically driven pump and the main pressure valve in a position relative to the pump, or if the mechanically driven pump during its non-operational mode generates a sufficient closing effect.

According to a second operating mode, where the vehicle is started, it is provided that that the mechanically driven oil pump and the electrically driven oil pump are driven;
the switching valve for the cooling oil supply of the starting element is for the most part open;
the main pressure valve is adjusted in such a manner that a control pressure, which is sufficient to shift the shifting elements, engages the pressure regulator;
an oil flow with a pressure, which is lower than the pressure going to the pressure regulator, is guided through the main pressure valve to the switching valve, and
the electrically driven oil pump also feeds at least that oil flow that is necessary, in addition to the oil flow fed by the mechanically driven oil pump, for cooling the starting element.

Although, in this second operating mode, both oil pumps are in operation, the power consumption of the electrically driven oil pump is limited to an output that can be safely operated which, in the end, saves fuel and prevents unnecessary pollution emissions.

In a third operating mode, it is provided that the mechanically driven oil pump is driven and the electrically driven oil pump is inactive;
the switching valve for the lubricating oil supply of the transmission is open and the cooling oil supply of the starting element is for the most part closed;
the main pressure valve is adjusted in such a manner that a control pressure, which is sufficient to shift the shifting elements, engages the pressure regulator;
an oil flow with a pressure, which is lower than the pressure going to the pressure regulator, is guided through the main pressure valve to the switching valve, and
a check valve, upstream from the electrically driven oil pump, is closed by the pressure of the oil flow fed through the main switching valve in such a manner that the oil cannot be discharged through the switched-off electrically driven oil pump.

In this third operating mode, the vehicle has been operating for some time at high speed following a startup procedure at medium or high rotational speed of the internal combustion engine so that the mechanically driven oil pump can sufficiently feed all components within the oil supply system. A subsequent cooling of the starting element is carried out only to a small degree. The electric pump is completely switched-off, which generates the advantages stated above.

The invention also concerns an arrangement for controlling an oil supply for an automatic transmission and a starting element in a vehicle according to at least one of the above methods, with a pump that can be mechanically driven by the internal combustion engine of a vehicle and a pump that can be driven by an electric motor with a pressure regulator for the transmission shifting elements within the main pressure line of the oil supply; with an oil cooler, elements for lubricating the transmission, and elements to cool the starting elements within the low pressure line of the oil supply, as well as a connection line between the main pressure line and the low pressure line of the oil supply.

This arrangement is also configured in such a manner that the mechanically driven pump is positioned within the main pressure line of the oil supply and the electrically driven pump is positioned within the low pressure line. A main pressure valve is positioned in the main pressure line and can be used to adjust an oil pressure generated by the mechanically driven oil pump to a main pressure in order to feed the main pressure line and a low pressure in order to feed the low pressure line and the connecting line joins the low pressure outlet of the main pressure valve and the low pressure line of the oil supply.

The above-mentioned basic provisions of the method can be implemented with this arrangement so that the described preferred effects can be achieved.

In a preferred development of the invention, it is provided that the mentioned connecting line empties into the low pressure line of the oil supply between a check valve and an oil cooler.

It is also deemed advantageous when a check valve is positioned in a prefill line between the main pressure line and the connecting line, that prevents oil from entering into the low pressure line under main pressure, but permits oil to enter into the main pressure line under low pressure.

Finally, it is possible that a check valve with a closed position is installed within the low pressure line downstream of the oil cooler, from where an oil line, which connects to transmission lubrication elements, originates and an oil line, which connects to elements of a starting element cooler can be controlled to open or to be let in with respect to the oil volume in a synchronized manner per time unit.

The described method and the described arrangement can be preferably installed in any vehicle equipped. Special advantages can be achieved, however, in vehicles with a start/stop function and in vehicles that have a hybrid engine, since these vehicles are mostly configured with emphasis on energy efficiency.

It should also be emphasized that, instead of two structurally separate oil pumps, a pump device can also be used, which can be driven mechanically either alternatively or simultaneously by way of an internal combustion engine or also electrically by way of an electric motor. A configuration such as this can be easily realized, for example, by way of a continuous pump shaft with free wheel clutches installed at opposite ends. In this case, the clutch would free wheel when the output generated by the electric motor exceeds the output that is supplied by the internal combustion engine.

On the other hand, it could also be possible to combine the output, which is generated by the internal combustion engine of the vehicle, with the lower output of the electrically pump drive, within the pump. Such an oil pump with two different drives therefore complies with the previously mentioned two structurally separate oil pumps. It is finally possible to provide more than only one electrically driven pump, wherein each of these two electrically driven pumps feeds a separate oil circuit.

BRIEF DESCRIPTION OF THE DRAWING

The invention will now be described, by way of example, with reference to the accompanying drawing in which.

DETAILED DESCRIPTION OF THE INVENTION

Figure 1:
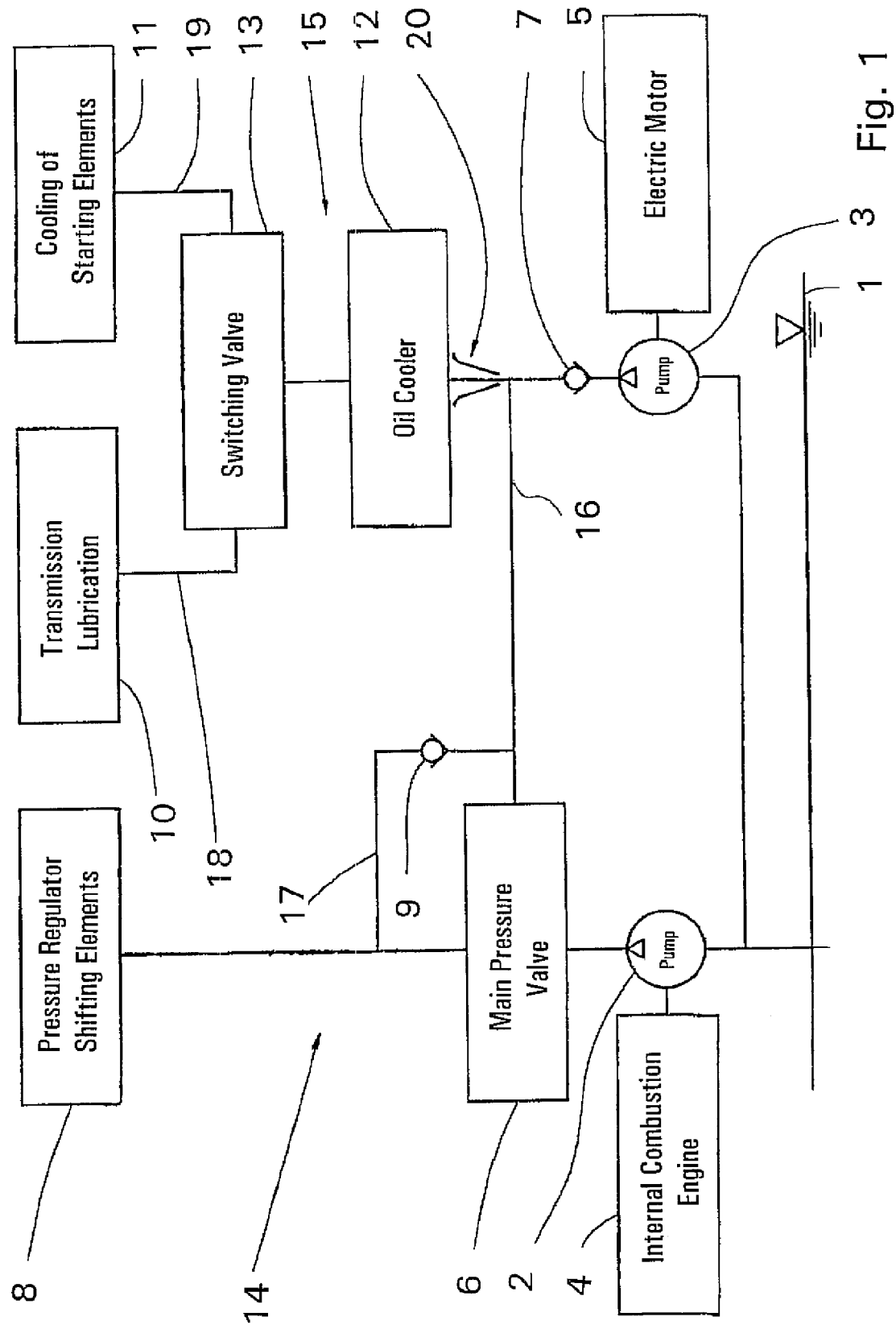
FIG. 1 shows an illustrated hydraulic schematic of an oil supply system in a vehicle for the implementation of the method according to the invention.

The oil supply system is comprised of a main pressure branch 14 on the left and a low pressure branch 14 on the right.

From a common oil reservoir 1, which can be, for instance, the oil sump for a transmission and/or an oil-cooled friction clutch, a branched oil line leads to the intake of two oil pumps, where the first oil pump 2 is mechanically driven by an internal combustion engine 4, and the second oil pump 3 is electrically driven by an electric motor 5. The discharge or pressure branches of the pumps 2 and 3 can be connected to each other through a main pressure valve 6, whereas a first check valve 7, which is installed downstream of the electrically driven oil pump 3, prevents the backflow of oil through the oil pump 3 into the reservoir 1, even when the electric motor 5 is switched off.

Oil pumps 2, 3 are both connected to the main pressure valve 6 and shifting elements 8 or other hydraulic control devices, which are connected, for instance, to hydraulic actuators within an automatic transmission and/or hydraulic actuators for the adjustment of a starting element, particularly an oil-cooled friction clutch (both not shown).

A second check valve 9 in a prefill line 17 permits the oil advanced by the electrically driven oil pump 3 to flow into the main pressure line 14, but prevents the flow in opposite direction. Both oil pumps 2, 3 are connected by way of the main pressure valve 6 and/or the first check valve 7 to a second line, the low pressure branch 15, which supplies elements 10 for the lubrication of a transmission and elements 11 for the cooling of the starting element. Inside of this low pressure branch 15 are also installed an oil cooler 12 and a switching valve 13 in closed position, wherein the latter is used to adjust the oil flow of this oil circuit 15 through oil lines 18 or 19 to the elements 10 for the lubrication of the transmission and elements 11 for the cooling of the starting element. The oil then flows back into the oil reservoir 1 (not shown).

During a starting procedure of the vehicle, the pump 3 is initially driven by the electric motor 5 to supply an oil flow with sufficient pressure through the main pressure valve 6 and/or through the second check valve 9 to the pressure regulator 8 and then to the shifting elements, in order to at least maintain a prefilling of the shifting members of the automatic transmission and/or permit a shifting of at least one of the starting elements and/or a quick start. The switching valve 13 is closed at this time, so that the entire pump output, which is generated by the electrically driven oil pump 3 (minus the feeding losses), is applied to the pressure regulator 8 and is thus available for the shifting elements.

As soon as the transmission and the starting element are in their proper conditions, the internal combustion engine 4 is started and will then drive the oil pump 2, following its startup, by way of a mechanical coupling that is resistant to high rotational speeds.

The pump output, generated by the mechanically driven oil pump 2, is transferred, via the main pressure valve 6, to the pressure regulator 8 for the shifting elements, the elements 10 for lubrication of the transmission, and to the elements 11 for cooling the starting element, wherein the distribution ratio and the individual oil pressures can be adjusted in the main pressure valve 6.

The oil pump 3, which is driven by the electric motor 5, can allocate, at the same time, a supplementary pump output to the pressure regulator 8 and the shifting elements, as well as the elements 10, 11 for lubrication of the transmission and cooling of the starting element 11. The switching valve 13 is opened for short time, no later than after the startup of the internal combustion engine 4, but can be at least partially opened earlier in order to guarantee optimal lubrication of the transmission as well as proper filling of the starting element with cooling oil in the phase prior to starting the internal combustion engine.

Finally, in a special variation shown in the Figure, a Venturi nozzle 20, is positioned within the low pressure branch 14, between the check valve 7 and the oil cooler 12, to aid in increasing the oil flow in the low pressure branch 15 from the mechanically driven oil pump and/or the electrically driven oil pump, while tolerating a pressure loss.

REFERENCE NUMERALS

1 oil reservoir
2 first oil pump, driven by the internal combustion engine 4
3 second oil pump, driven by the electric motor 5
4 internal combustion engine
5 electric motor
6 main pressure valve
7 first check valve
8 pressure regulator for shifting elements
9 second check valve
10 elements for the lubrication of the transmission
11 elements for the cooling of the starting element
12 oil cooler
13 switching valve
14 main pressure branch of the oil supply
15 low pressure branch of the oil supply
16 connecting line
17 prefill line
18 oil line
19 oil line
20 conversion device, Venturi nozzle

The invention claimed is:

1. A method of controlling a supply of oil to an automatic transmission and a starting element of a vehicle, the method comprising the steps of:
providing at least first and second oil pumps (2, 3) for supplying oil to at least one of a hydraulic control device of the automatic transmission and the starting element (11);
mechanically driving the first oil pump (2) with an internal combustion engine (4) to provide an oil flow to a high pressure branch (14) of an oil supply assembly;
electrically driving the second oil pump (3) to provide oil to the hydraulic control device at least when the internal combustion engine (4) is inactive and during at least one other operating condition; and
cooling the starting element (11) with an oil flow, provided by at least the electrically driven second oil pump (3) at least during a starting procedure of the vehicle, and the electrically driven second oil pump (3) providing pressure to a low pressure branch (15) of the oil supply assembly;
determining a supply of electrical energy necessary for operating the second oil pump (3);
emitting a first shortage signal when the supply of electrical energy falls below a first threshold value; and
at least one of:
delaying the starting procedure until a capacitor is essentially fully charged, and when the supply of electrical energy falls below a second threshold value which is lower than the first threshold value, emitting a second shortage signal with the device for determining the supply of electrical energy necessary for operating the second oil pump (3); and
discontinuing operation of the second oil pump (3) such that the oil flow necessary for cooling the starting element (11), during the starting procedure, is provided solely by the first oil pump (2), and at least one of the hydraulic control device of the automatic transmission and the starting element (11) configures the starting procedure reduce an amount of heat generated in the starting element (11).

2. The method of claim 1, further comprising the step of, when the internal combustion engine (4) is turned off, driving the electrically driven first oil pump (2) with electrical power from at least one of a battery and a capacitor.

3. A method of controlling a supply of oil to an automatic transmission and a starting element of a vehicle, the method comprising the steps of:
providing at least first and second oil pumps (2, 3) for supplying oil to at least one of a hydraulic control device of the automatic transmission and the starting element (11);
mechanically driving the first oil pump (2) with an internal combustion engine (4) to provide an oil flow to a high pressure branch (14) of an oil supply assembly;
electrically driving the second oil pump (3) to provide oil to the hydraulic control device at least when the internal combustion engine (4) is inactive and during at least one other operating condition;
cooling the starting element (11) with an oil flow, provided by at least the electrically driven second oil pump (3) at least during a starting procedure of the vehicle, and the electrically driven second oil pump (3) providing pressure to a low pressure branch (15) of the oil supply assembly; and
determining, with an oil flow demand sensor, at least one of:
a current and a directly following oil volume demand for at least one of the hydraulic control device and the starting element (11),
a current and a directly following demand of oil volume from the first oil pump (2), and
an additional oil volume demand based on the demand of oil volume and an oil pump output from the first oil pump (2).

4. The method of claim 3, further comprising the step of considering an oil temperature when determining at least one of the oil volume demand, the oil pump output, and the additional oil volume demand.

5. The method of claim 3, further comprising the step of controlling the second oil pump (3) to provide a flow of oil at least equal to the additional oil volume demand.

6. A method of controlling a supply of oil to an automatic transmission and a starting element of a vehicle, the method comprising the steps of:
providing at least first and second oil pumps (2, 3) for supplying oil to at least one of a hydraulic control device of the automatic transmission and the starting element (11);
mechanically driving the first oil pump (2) with an internal combustion engine (4) to provide an oil flow to a high pressure branch (14) of an oil supply assembly;
electrically driving the second oil pump (3) to provide oil to the hydraulic control device at least when the internal combustion engine (4) is inactive and during at least one other operating condition;
cooling the starting element (11) with an oil flow, provided by at least the electrically driven second oil pump (3), at least during a starting procedure of the vehicle, and the electrically driven second oil pump (3) providing pressure to a low pressure branch (15) of the oil supply assembly, and
at least one of:

during a first one of the at least one other operating condition in which the first oil pump (2) is not being driven by the internal combustion engine (4) and the second oil pump (3) is being driven, activating a switching valve (13) to suppress an oil flow from the second oil pump (3) to a transmission lubricating oil supply (10) and the oil provided to cool the starting element (11) whereby oil is prevented from flowing into a common oil reservoir (1) through the first oil pump (2), and providing pressurized oil from the second oil pump (3) and via a pressure regulator (8) to shifting elements of the automatic transmission such that the shifting elements will be one of prefilled and retained as prefilled;

during a second one of the at least one other operating condition in which the first oil pump (2) is being driven by the internal combustion engine (4) and the second oil pump (3) is being driven, passing the oil flow for cooling the starting element (11) through an at least substantially open switching valve (13) to the starting element (11), controlling a main pressure valve (6) to allow a shifting pressure to be applied to a pressure regulator (8), wherein the shifting pressure is sufficient to shift at least one shifting element of the transmission, passing an oil flow through the main pressure valve (6) to the switching valve (13) at a pressure lower than the oil flow passing through the main pressure valve (6) to the pressure regulator (8), combining an oil flow form the second oil pump (3) that is necessary for cooling the starting element (11) with the oil flow from the first oil pump (2); and during a third one of the at least one operating condition in which the first oil pump (2) is being driven by the internal combustion engine (4) and the second oil pump (3) is not being driven, actuating a switching valve (13) to pass the oil flow to a transmission lubricating oil supply (10) and to substantially prevent passage of the oil flow to the starting element (11), actuating a main pressure valve (6) to allow a shifting pressure to be applied to a pressure regulator (8), wherein the shifting pressure is sufficient to shift at least one shifting element of the transmission, passing an oil flow through the main pressure valve (6) to the switching valve (13) at a pressure lower than the oil flow passing through the main pressure valve (6) to the pressure regulator (8), and by operation of a check valve (7) located downstream from the second oil pump (3), preventing passage of the oil flow from the second oil pump (3) due to the pressure of the oil flow passed through the main switching valve (6).

7. The method of claim 6, further comprising the step of using a hybrid drive to provide drive for the vehicle.

8. The method of claim 6, further comprising the step of providing the vehicle with a start and a stop function.

9. An assembly for controlling oil supply to an automatic transmission and a starting element of a vehicle the assembly comprising:

a first oil pump (2), located within a high pressure branch (14), being mechanically driven by an internal combustion engine (4) to supply an oil flow under high pressure;

a second oil pump (3), located within a low pressure branch (15), being electrically driven by an electric motor (5) to supply an oil flow under low pressure;

a pressure regulator (8), located within the high pressure branch (14), for shifting at least one transmission shifting element;

an oil cooler (12), transmission lubrication elements (10), and a starting element cooler (11) being located within the low pressure branch (15);

a high pressure valve (6), located within the main pressure line (14), for adjusting the oil flow under high pressure supplied by the first oil pump (2); and a connecting line (16) being to a low pressure outlet of the high pressure valve (6) and the low pressure branch (15) such that the high pressure branch (14) being connected to the low pressure branch (15).

10. The arrangement of claim 9, wherein the connecting line (16) is connected to the low pressure line (15) at a point between a check valve (7) and the oil cooler (12).

11. The arrangement of claim 9, wherein a check valve (9) is located within a prefill line (17), between the high pressure branch (14) and the connecting line (16), to prevent oil from flowing into the low pressure branch (15) under high pressure and to permit the oil to flow into the high pressure branch (14) under low pressure.

12. The arrangement of claim 9, wherein a switching valve (13) is located in the low pressure branch (15) downstream from the oil cooler (12), the switching valve (13) is connected, via a first oil line (18), to the transmission lubrication elements (10) and, via a second oil line (19), to starting elements (11), the switching valve (13) controllably allows the passage of oil flow depending on at least one of a volume of oil passed and passage of a unit of time.

* * * * *